United States Patent [19]
Lee

[11] Patent Number: 5,596,894
[45] Date of Patent: Jan. 28, 1997

[54] LOCK STRUCTURE FOR THE AUTOMATIC SHIFT LEVER OF A CAR

[76] Inventor: Chi-Yuan Lee, Back Building, No. 740-7, Chung-Cheng Road, Hsin-Chuang City, Taipei, Taiwan

[21] Appl. No.: 372,334

[22] Filed: Jan. 13, 1995

[51] Int. Cl.$^6$ ............................................. F16H 57/00
[52] U.S. Cl. ..................... 70/201; 70/181; 70/247
[58] Field of Search .......................... 70/181, 192, 201, 70/202, 204, 237, 238, 247, 229–231, 379–380; 74/519, 543, 557

[56] References Cited

U.S. PATENT DOCUMENTS

| | | | |
|---|---|---|---|
| 698,841 | 4/1902 | Klein | 70/181 X |
| 999,462 | 8/1911 | Miller | 70/181 X |
| 1,552,409 | 9/1925 | Anderson | 70/204 |
| 1,643,480 | 9/1927 | Wiswell | 70/247 |
| 2,605,630 | 8/1952 | Keeler | 70/181 |
| 2,676,479 | 4/1954 | Bethune | 70/181 |
| 2,950,614 | 8/1960 | Evans | 70/181 |
| 3,247,691 | 4/1966 | Martin | 70/181 |
| 3,600,912 | 8/1971 | Foreman | 70/230 X |
| 5,081,856 | 1/1992 | Hsu | 70/247 |
| 5,134,764 | 8/1992 | Taylor | 70/201 X |

FOREIGN PATENT DOCUMENTS

| | | | |
|---|---|---|---|
| 815645 | 7/1937 | France | 70/201 |
| 2590857 | 6/1987 | France | 70/247 |
| 2343210 | 1/1975 | Germany | 70/201 |
| 416741 | 7/1944 | Italy | 70/379 A |
| 4283133 | 10/1992 | Japan | 70/247 |

Primary Examiner—Suzanne L. Dino
Attorney, Agent, or Firm—Bacon & Thomas

[57] ABSTRACT

A lock structure, which can prevent shifting of a control link and a push button of an automatic shift lever in a car, having a lever lock, an axle tube and a limiting block in a sheath. By engaging with of the lever lock, the axle tube and the limiting block, an depression of the push button for shifting can be prevented. When unlocked, a lock core on the lever lock can be turned to align the axle tube and the protruding pieces provided on the surface to allow displacement of the push button for normal shifting. The lock is locked by turning the lock core to prevent depression of the push button.

13 Claims, 18 Drawing Sheets

B-B

LOCK STRUCTURE FOR THE AUTOMATIC SHIFT LEVER OF A CAR

BACKGROUND OF THE INVENTION

1. Field of the Invention

The present invention relates to a lock structure for an automatic shift lever of a car, which comprises a lever lock, an axle tube, a sheath and a limiting block, and is capable of automatically limiting the positions of a push button and a control link, while in a locked state. The control link cannot be pressed or moved by any exterior force.

2. Description of the Prior Art

Theft-proof devices for automobiles presently in the market are divided into three kinds, theft-proof bells, steering wheel locks, and shift lever locks. We hereby discuss the principles and disadvantage thereof:

1) a theft-proof bell uses a balancing principle to allow the switch of a buzzer to be turned on for scaring away a thief; however, if a passenger inadvertently touches the car body, or even when vibration is effected by a car passing by, the bell will make a loud noise, which can break the quiet and peaceful mood of people. The theft-proof bell is operated by the battery of the car, so that the car is subjected to electricity leakage when parking.

2) a steering wheel lock provides a lock head in the middle of a bar to lock on the surface of the steering wheel, with the two ends of the bar abutting against both sides of a space in the car, so as to limit the steering wheel rotation; alternatively, an extendible hooking bar can be used to lock the steering wheel by locking of the lock head with one end of the bar hooking the steering wheel and the other end hooking the pedal of the accelerator. However, this is bothersome to use, and some drivers hate to use the steering wheel lock when parking. The theft of a car often happens in such a short parking time.

3) a shift lever lock provides a lock head at one side of the seat for the shift lever, with a pivotally connecting hole on the lock head facing the shift lever and engaged by a U shaped locking hook to lock the shift lever and thus prevent the same from moving. However, when the lock is opened or closed, a driver must turn his body to insert a key into the lock hole with one hand, and to draw away or engage the lock head from/with the U shaped locking hook. This is quite inconvenient to operate with two ha a narrow space in a car.

In view of the above stated disadvantage on a conventional theft-proof car lock, the inventor of the present invention has developed a lock structure for an automatic shift lever of a car, which operates on the principle that deviation of a stop piece on a lever lock stops a control link, thus rendering a control button immovable. Therefore, in turn, the shift control lever is not able to move. The object of locking can thus be achieved, and with this, the disadvantage of inconvenience in operation and in assembling the conventional U shaped locking hook and lock head used for locking the shift lever can be eliminated. However, it can be seen from FIG. 10, when a shift control lever 4' is pressed down in a normal shifting action, a limiting rod 41' extending sidewardly on the bottom end thereof will move downwardly to be free from the limitation of a guiding groove 51' on a guiding plate 5', so that the shift lever 6' can be moved forwardly and backwardly freely, i.e., so long as the limiting rod 41' is free from limitation of the guiding groove 51', the shift lever 6' can be moved; in other words, if a thief is familiar with the way of locking of the invention and the principle of operation of the automatic shift lever, he can then use an iron sheet to insert into the gap between the shift lever 6' and the seat 61' for the shift lever 6', to twist and press the same, as long as it presses the limiting rod 41' to move down the shift control lever 4', the shift lever 6' can be shifted, in this way, the lock structure will be of no use. The way to open it is not so easy for a thief to know, because he must know well the way of locking as well as the structure of a car.

SUMMARY OF THE INVENTION

Particularly, the lock structure for the automatic shift lever of a car of the present invention adds, beside the basic elements for the shift lever, at least a lever lock, an axle tube, a sheath and a limiting block; wherein, the sheath and the limiting block are located respectively in and outside the axle tube. The sheath is fixed at the section between a knob and the shift lever, while the limiting block is fixed on the top end of the control link of the shift lever. When a user rotates the axle tube a predetermined angle by rotating the lever lock, the external edge of the axle tube gets free from limitation of the sleeve to press the limiting block and the control link to therefore allow the shift lever to shift as normal. When it is locked, the axle tube and a button on the top thereof can not be pressed down, the limiting block on the top of the control link cannot be moved by limiting of the axle tube. It cannot be moved even if it is pried from one side. The structure of the present invention thus presents a perfect locking state.

The main object of the present invention is to provide a lock structure for an automatic shift lever of a car, wherein by means of linking-up relationship among the lever lock, the axle tube, the sheath and the limiting block, the control link of the control shift lever cannot, except when unlocked, be pressed down or moved, so that a thief will have no chance to steal the car. Thus 100% of theft-proofing effect can be achieved.

The secondary object of the present invention is to provide a lock structure for an automatic shift lever of a car, which can achieve theft protection without providing a U shaped locking hook and a lock head, and which can also achieve the object of easy operation and space saving.

The present invention will be apparent after reading the detailed description of the preferred embodiment thereof in reference to the accompanying drawings.

3

Figure 6:
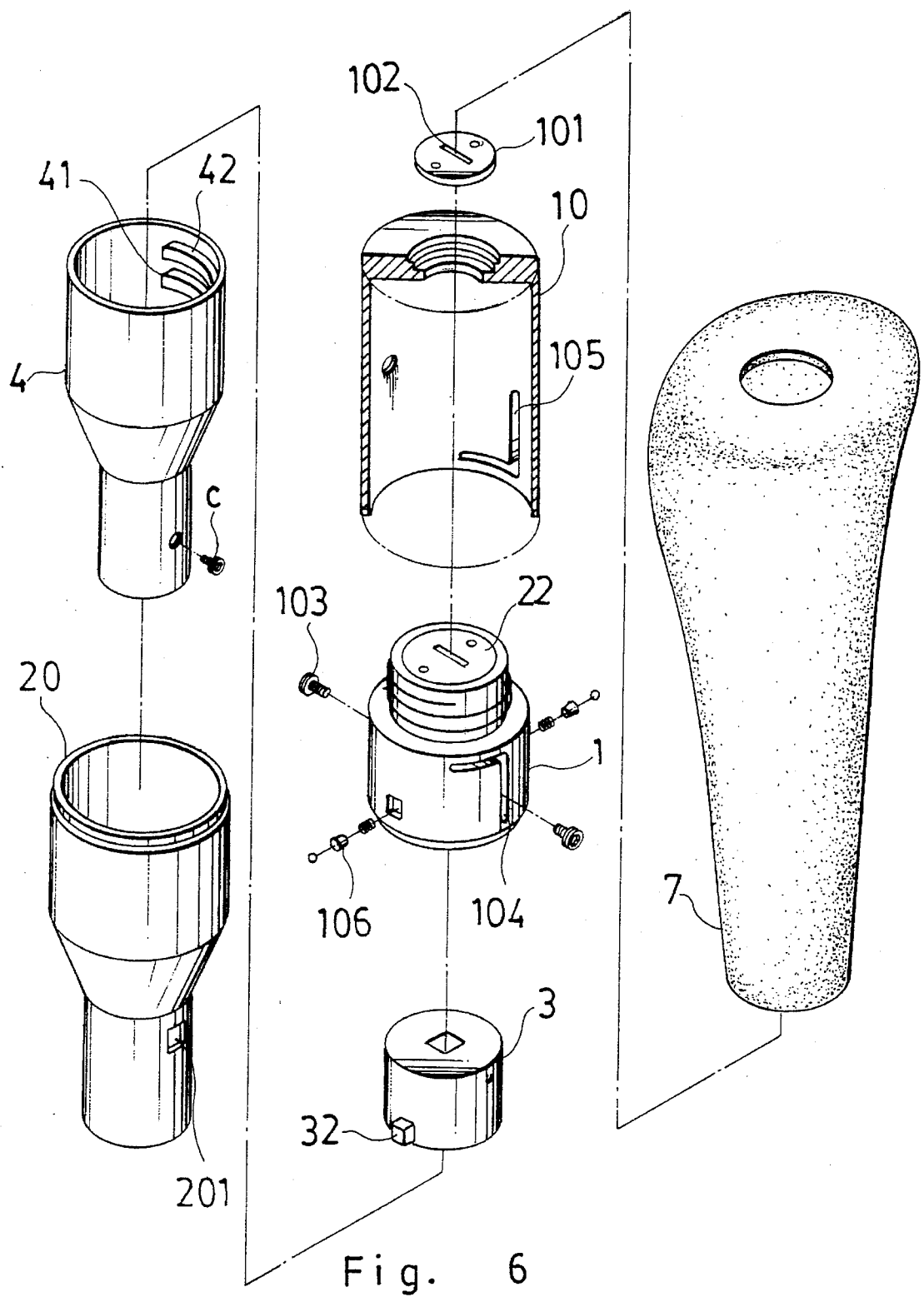
Figure 6A:
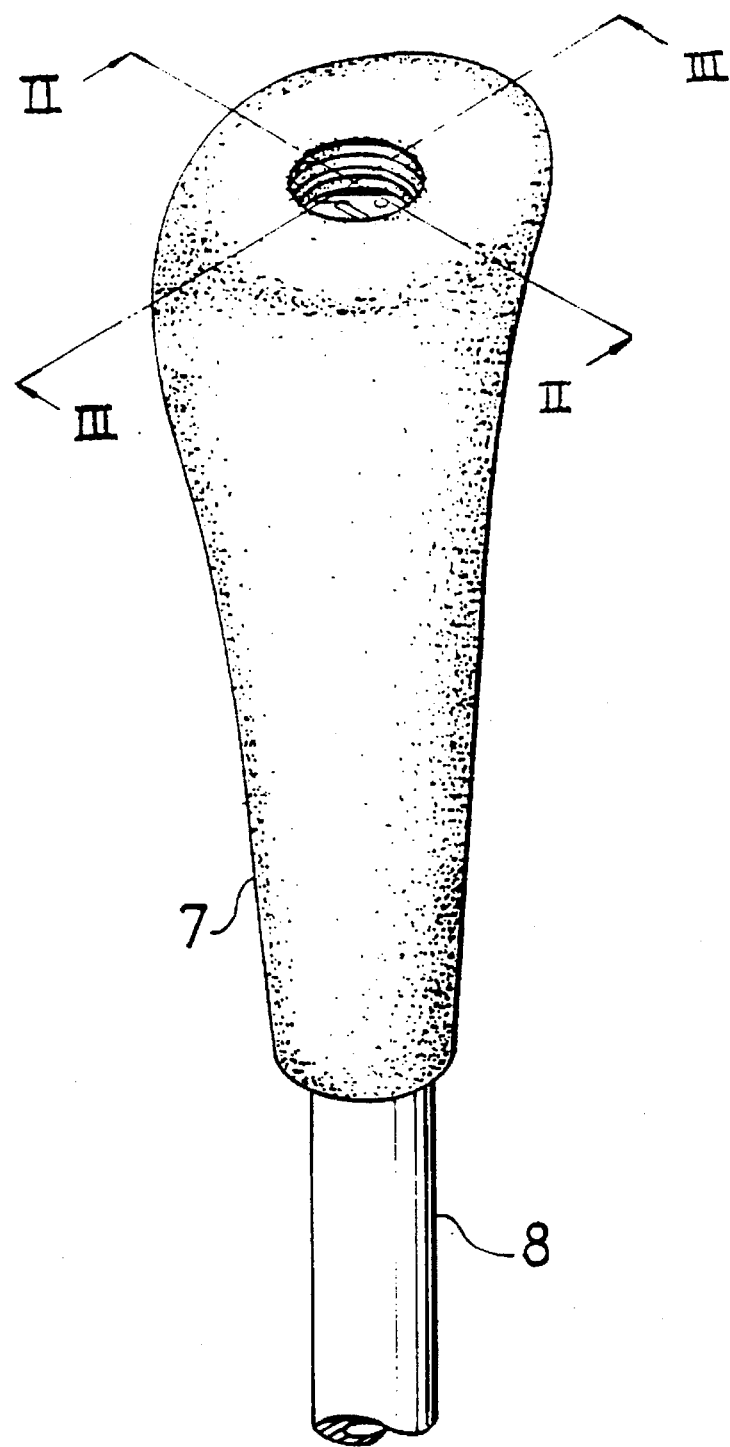
Figure 6B:
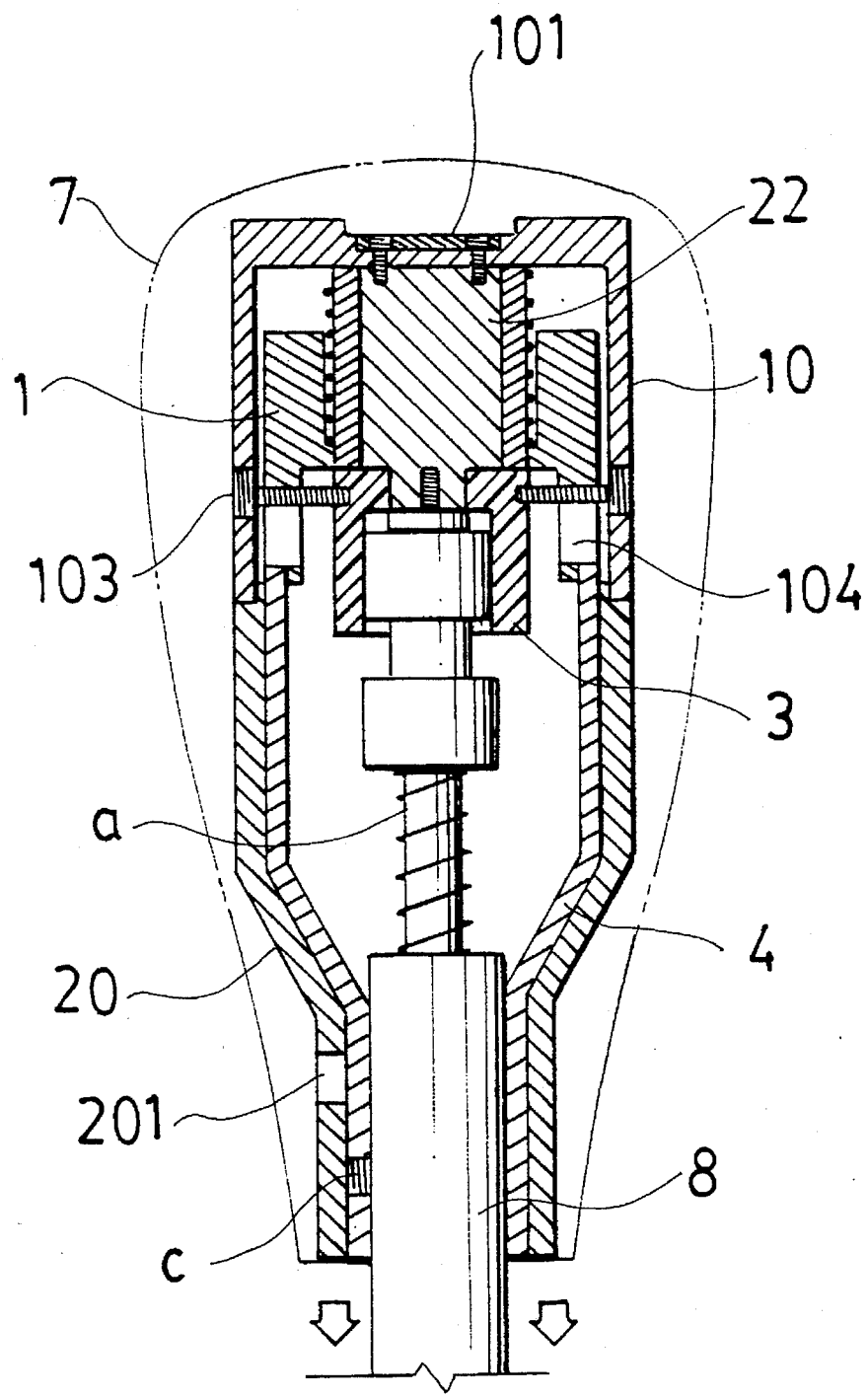
Figure 6:
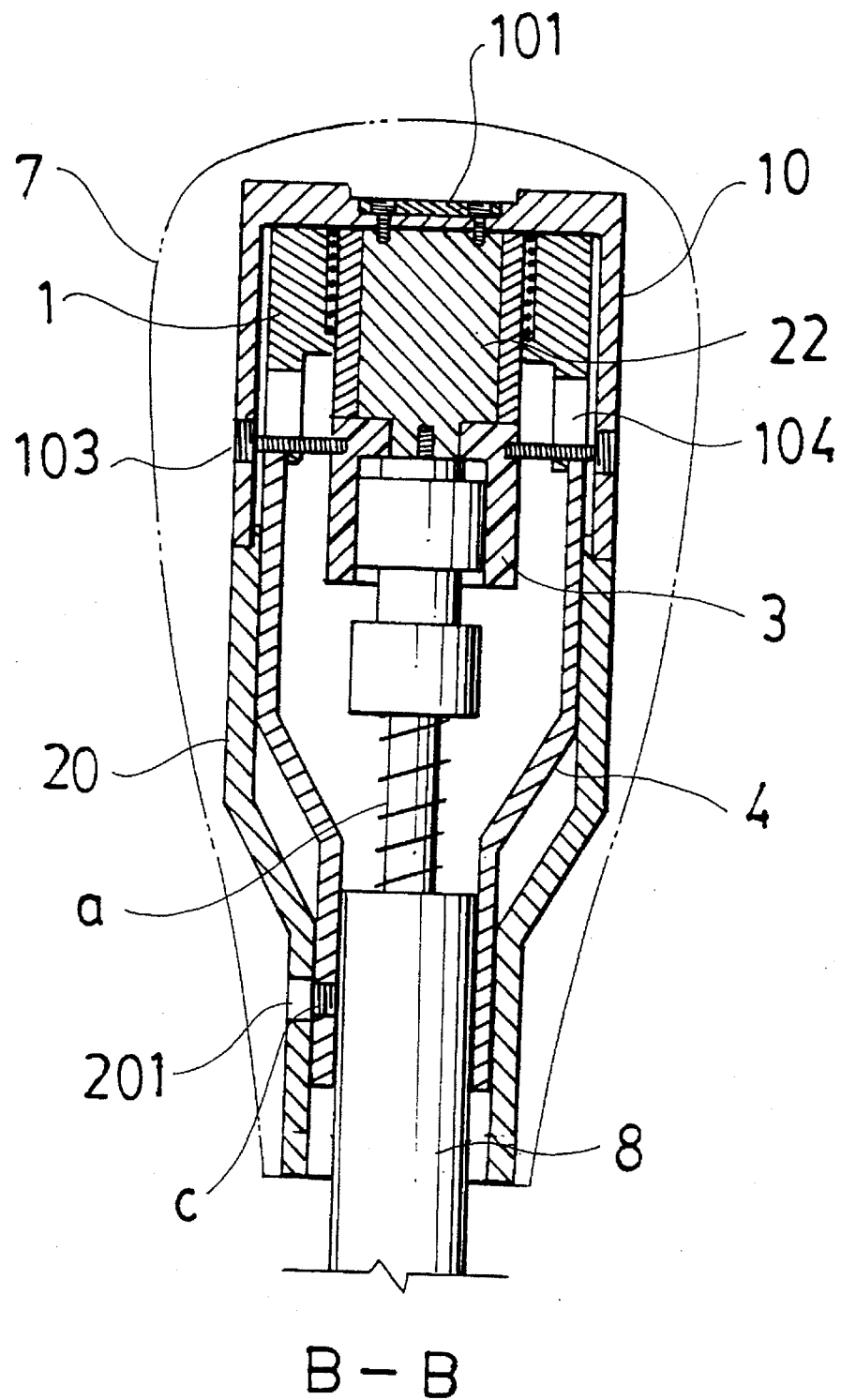
Figure 6D:
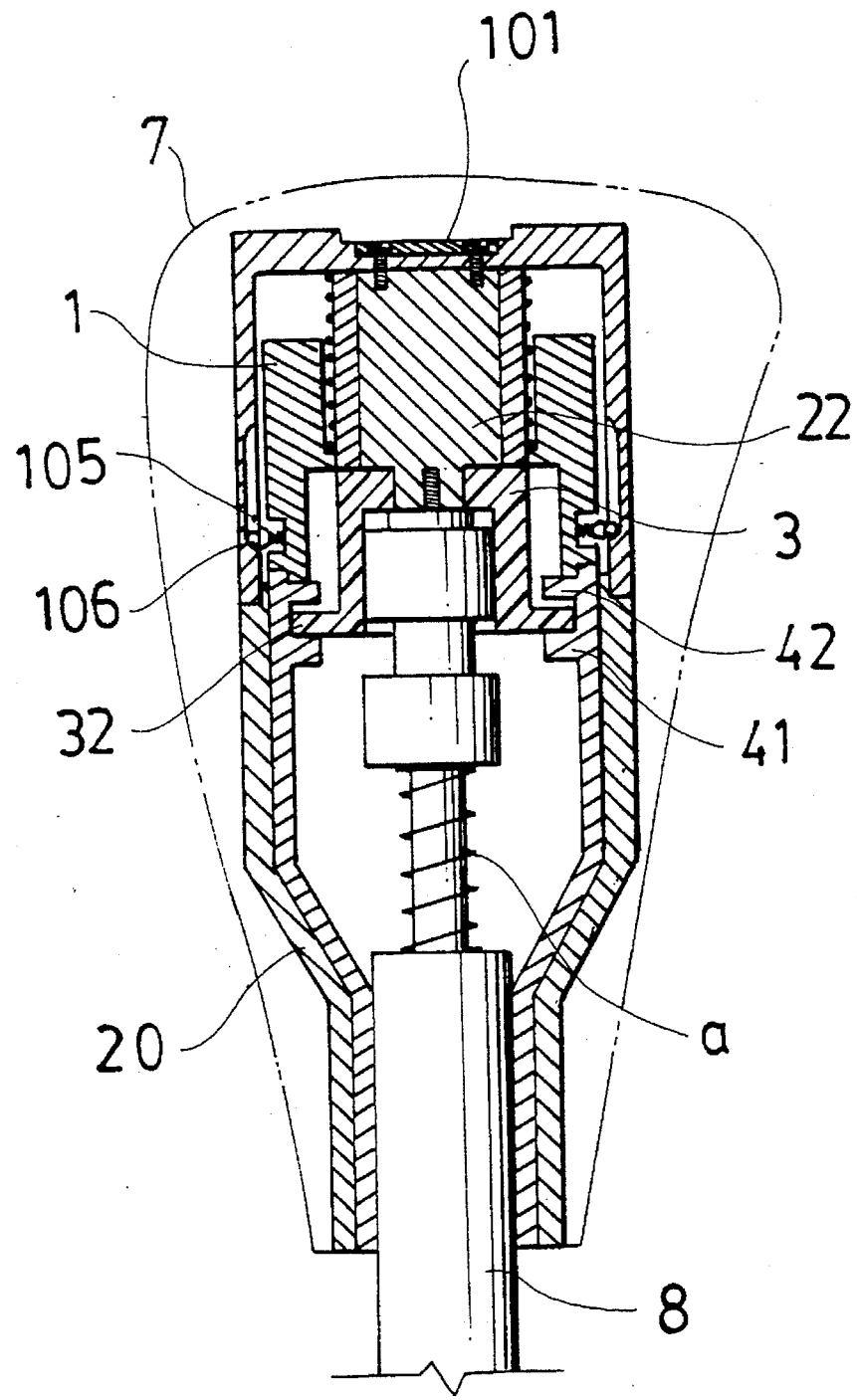
Figure 7:
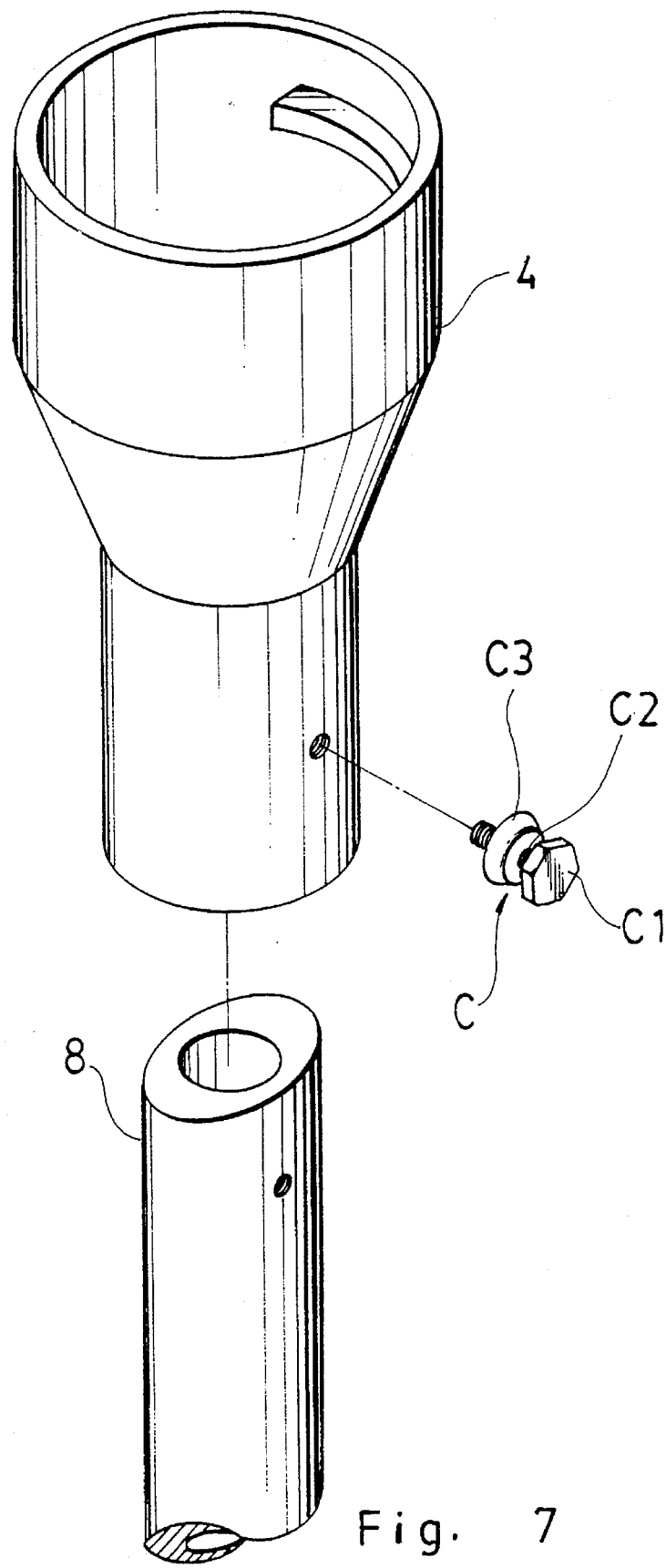
Figure 8:
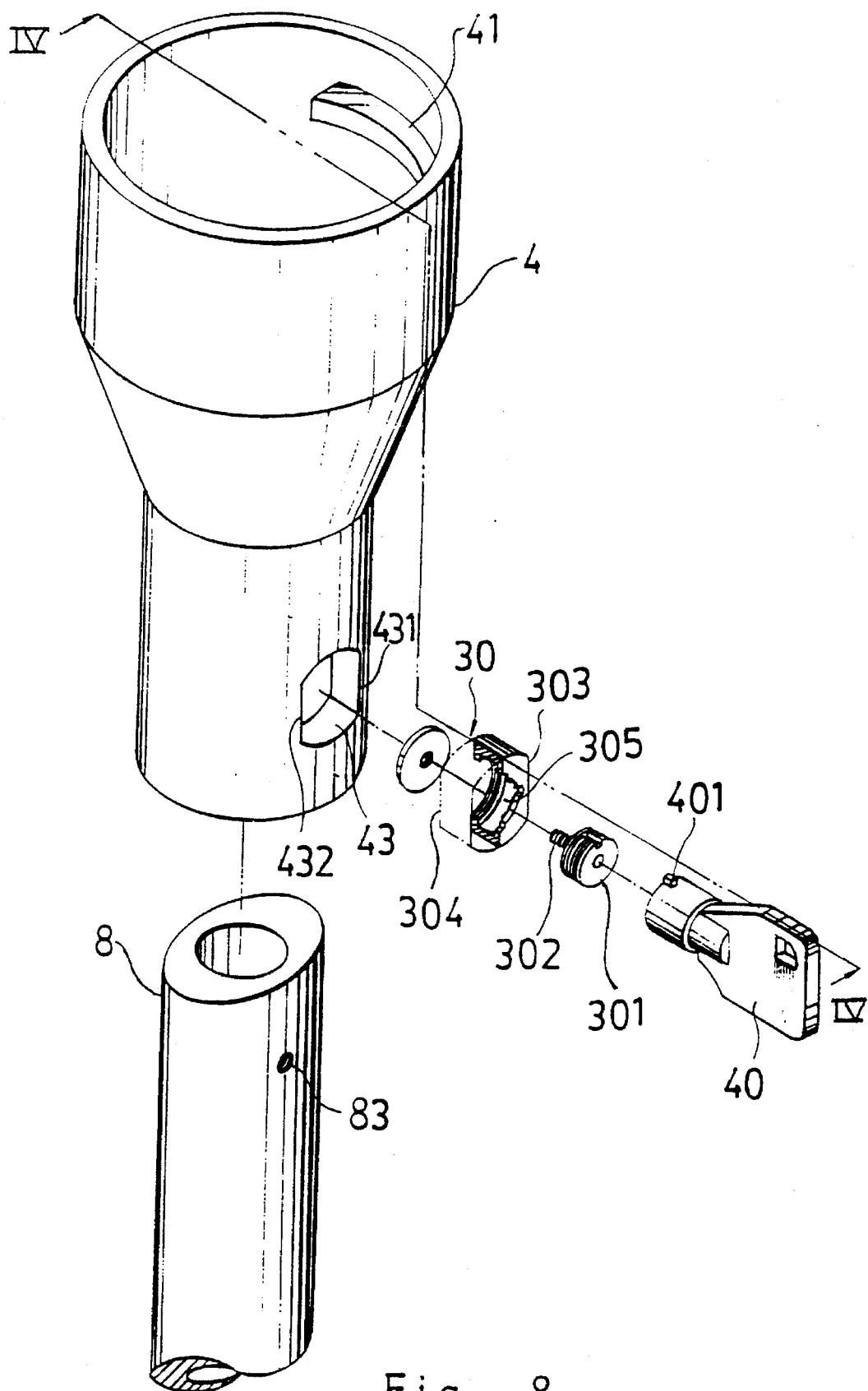
Figure 8A:
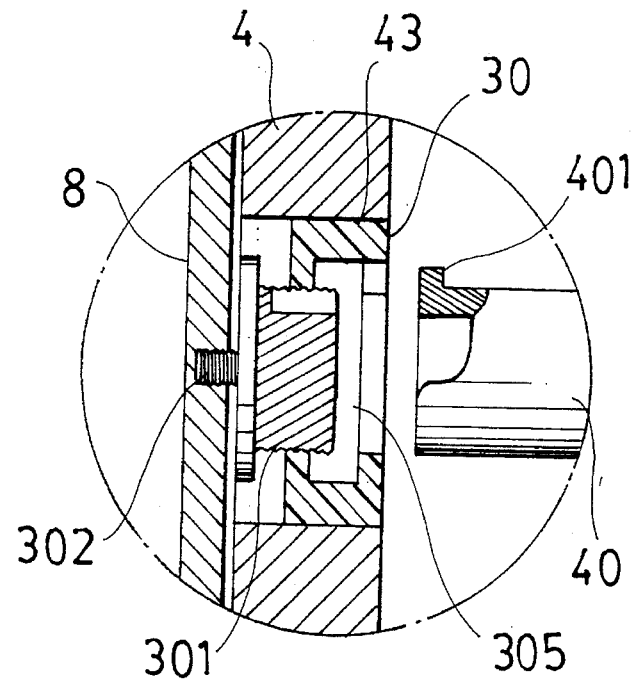
Figure 8B:
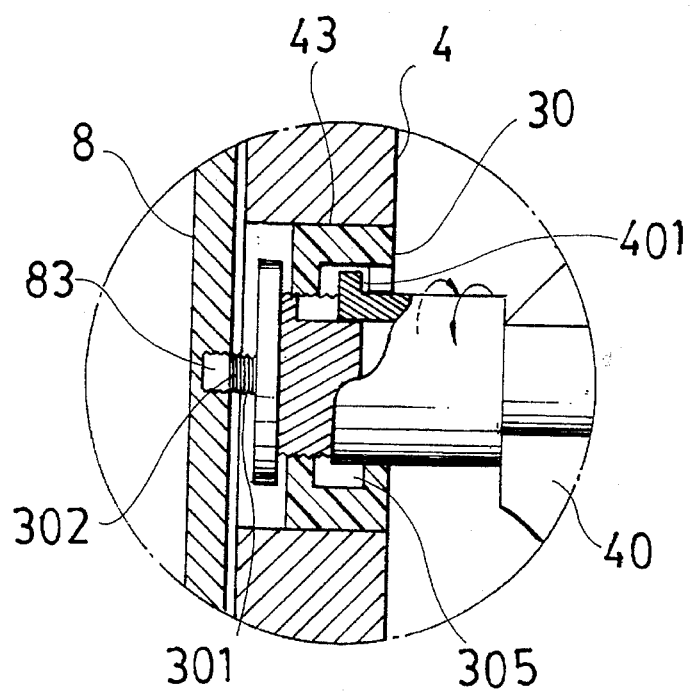
Figure 8C:
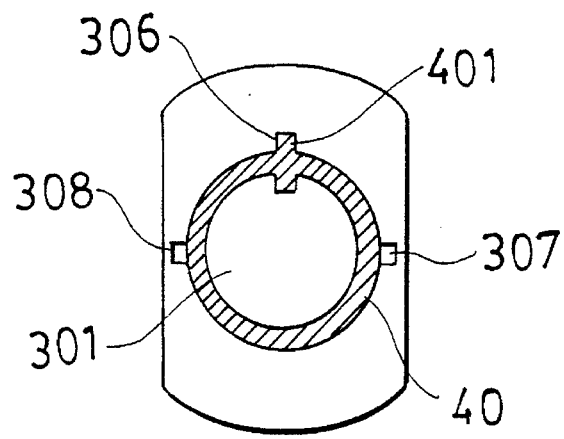
Figure 8D:
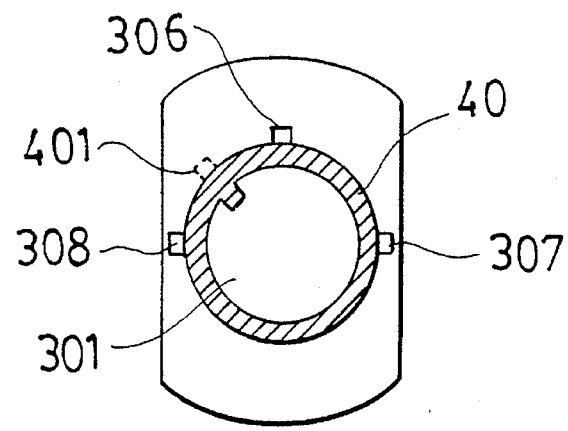
Figure 8E:
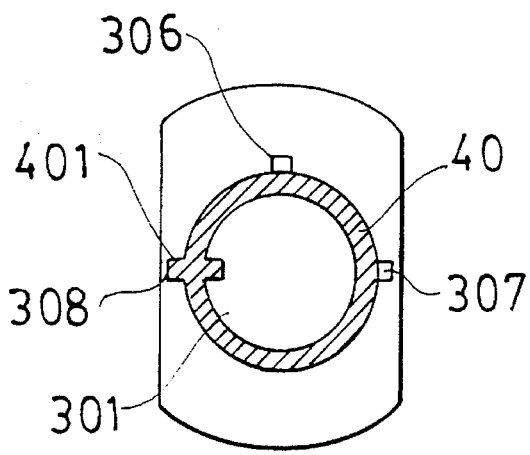
Figure 9:
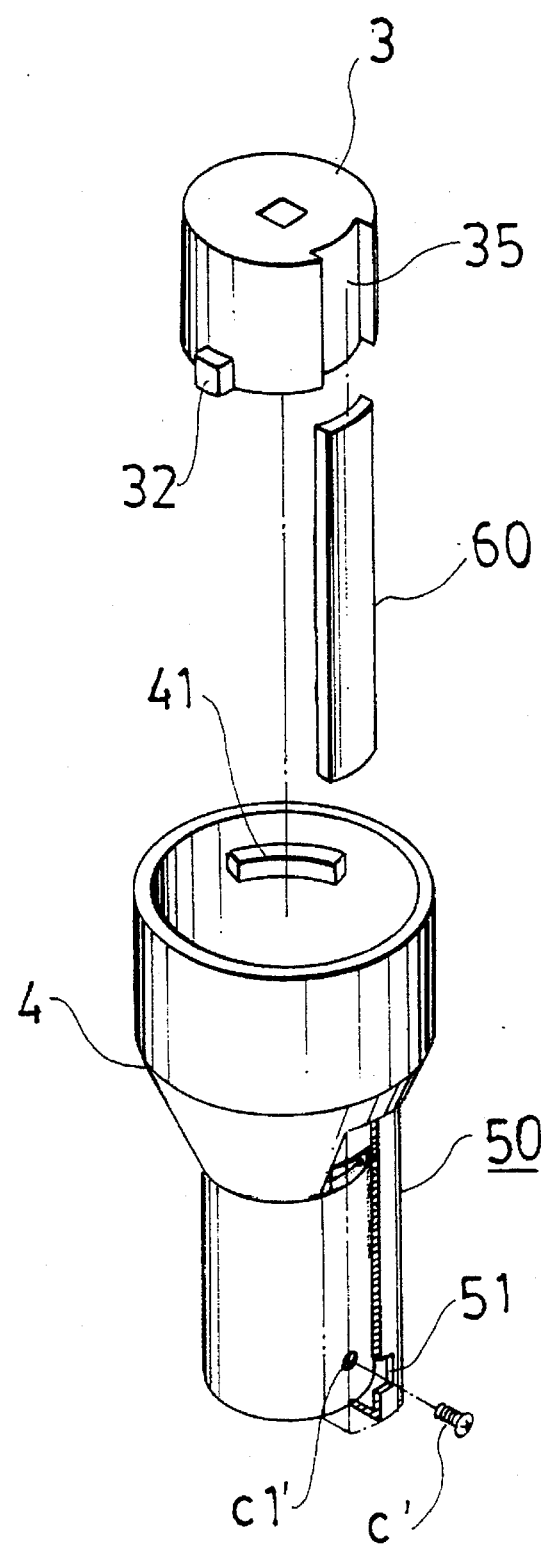
Figure 9A:
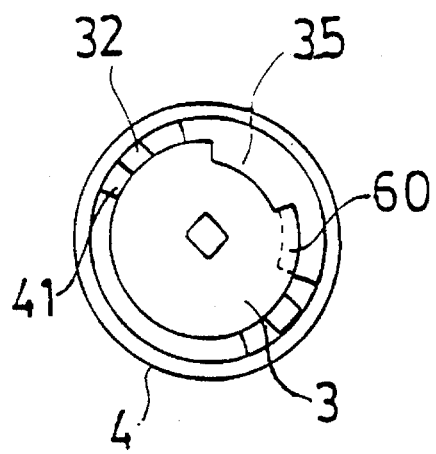
Figure 9C:
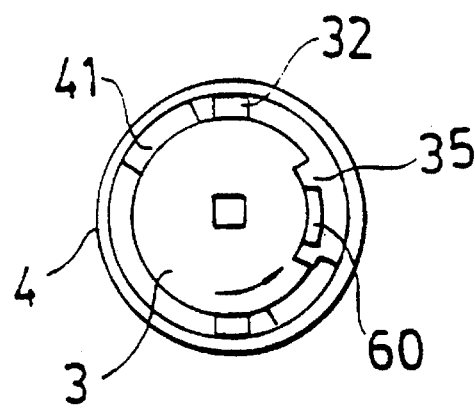
Figure 9B:
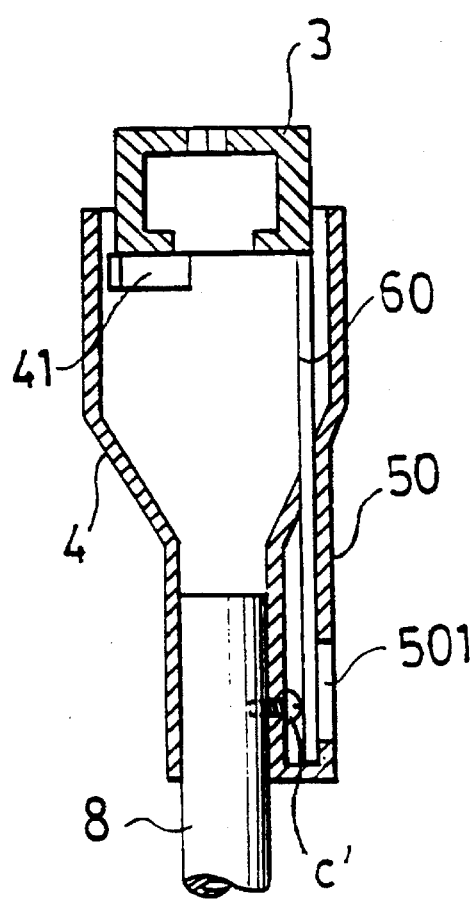
Figure 9D:
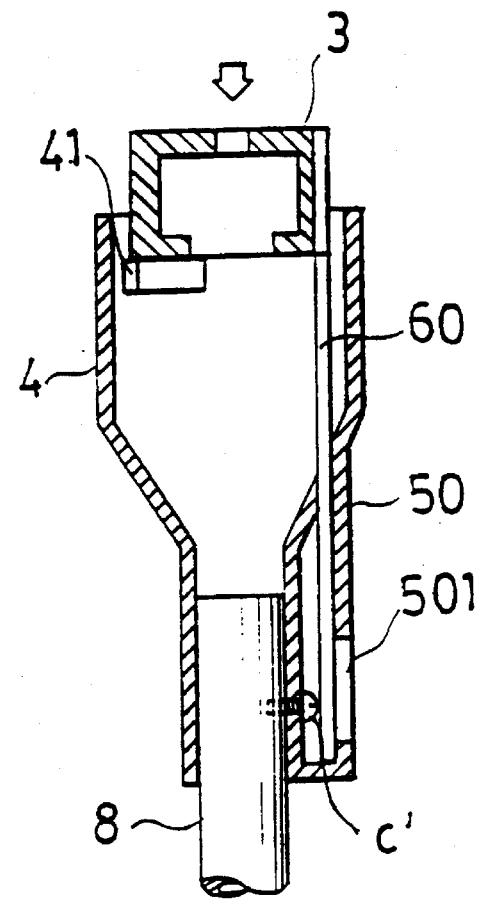
Figure 10:
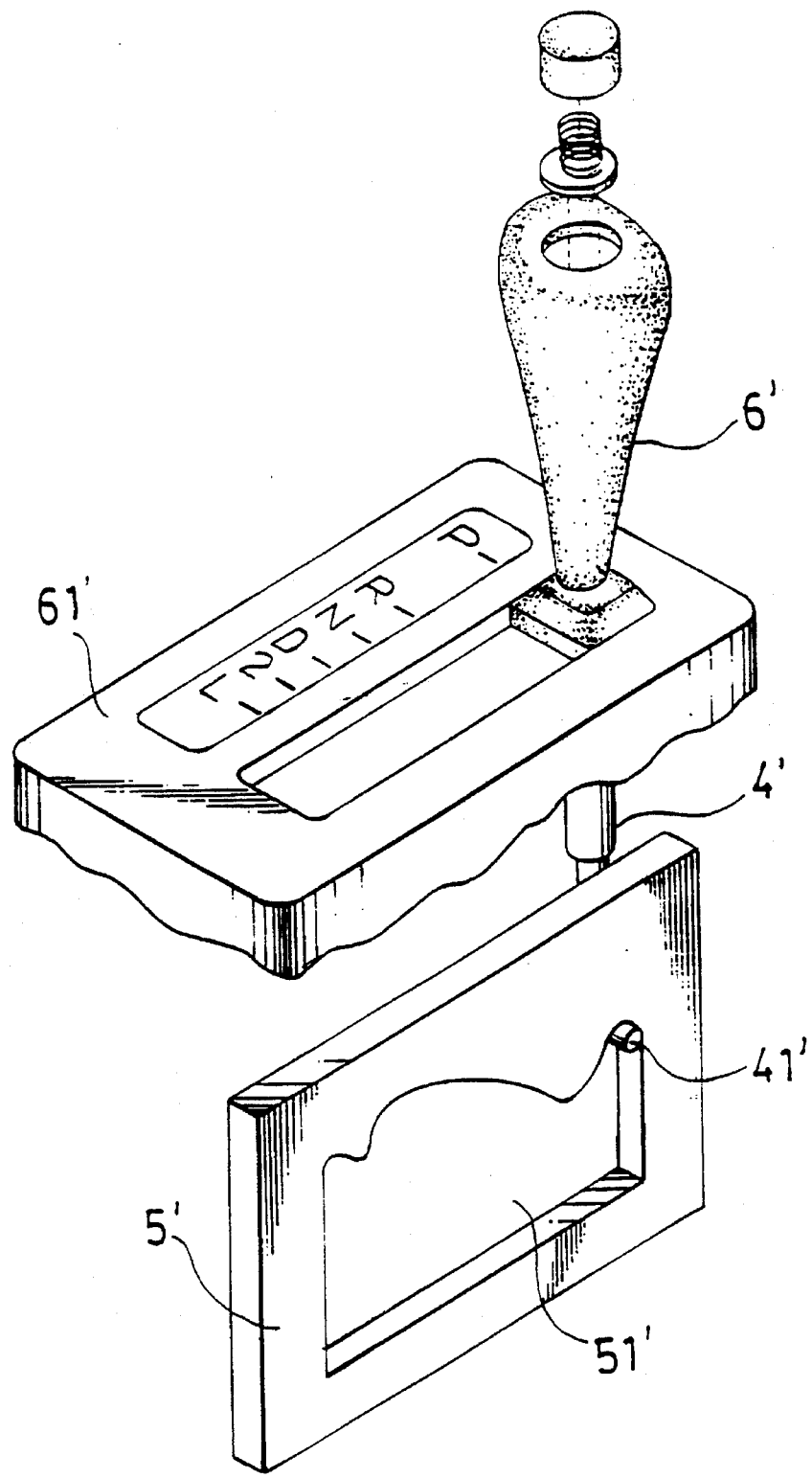

FIG. 6 is an exploded perspective view of a second embodiment of the present invention;

FIG. 6A is a perspective view of the second embodiment of the present invention after assembling;

FIG. 6B is a sectional view of the second embodiment of FIG. 6A taken along a sectional line II—II;

FIG. 6C is a cross-sectional view of the second embodiment of FIG. 6A showing a pressing action; FIG. 6D is a sectional view of the second embodiment of FIG. 6A taken from a sectional line III—III;

FIG. 7 is an exploded perspective view showing a screw mounted on the present invention;

FIG. 8 is an exploded perspective view showing assembling of a fixing mechanism for the sheath and the protecting sleeve of the present invention;

FIG. 8A is a sectional view of the fixing mechanism taken from a sectional line IV—IV in FIG. 8;

FIG. 8B is a similar sectional view showing a key rotating a latch in the fixing mechanism of FIG. 8;

FIG. 8C is a schematic view showing the key being located in alignment with a releasing hole;

FIG. 8D is a schematic view showing the key overpassing a releasing hole;

FIG. 8E is a schematic view showing the key being turned back to a releasing hole for being drawn out;

FIG. 9 is an exploded perspective view showing a protecting structure of the present invention;

FIGS. 9A and 9B are top and side cross-sectional views showing the protecting structure of FIG. 9 being locked when assembled;

FIGS. 9C and 9D are top and side cross-sectional view showing the protecting structure of FIG. 9 being disclosed when assembled;

FIG. 10 is a perspective view showing the structure of a conventional automatic shift

DETAILED DESCRIPTION OF THE PREFERRED EMBODIMENT

Figure 1:
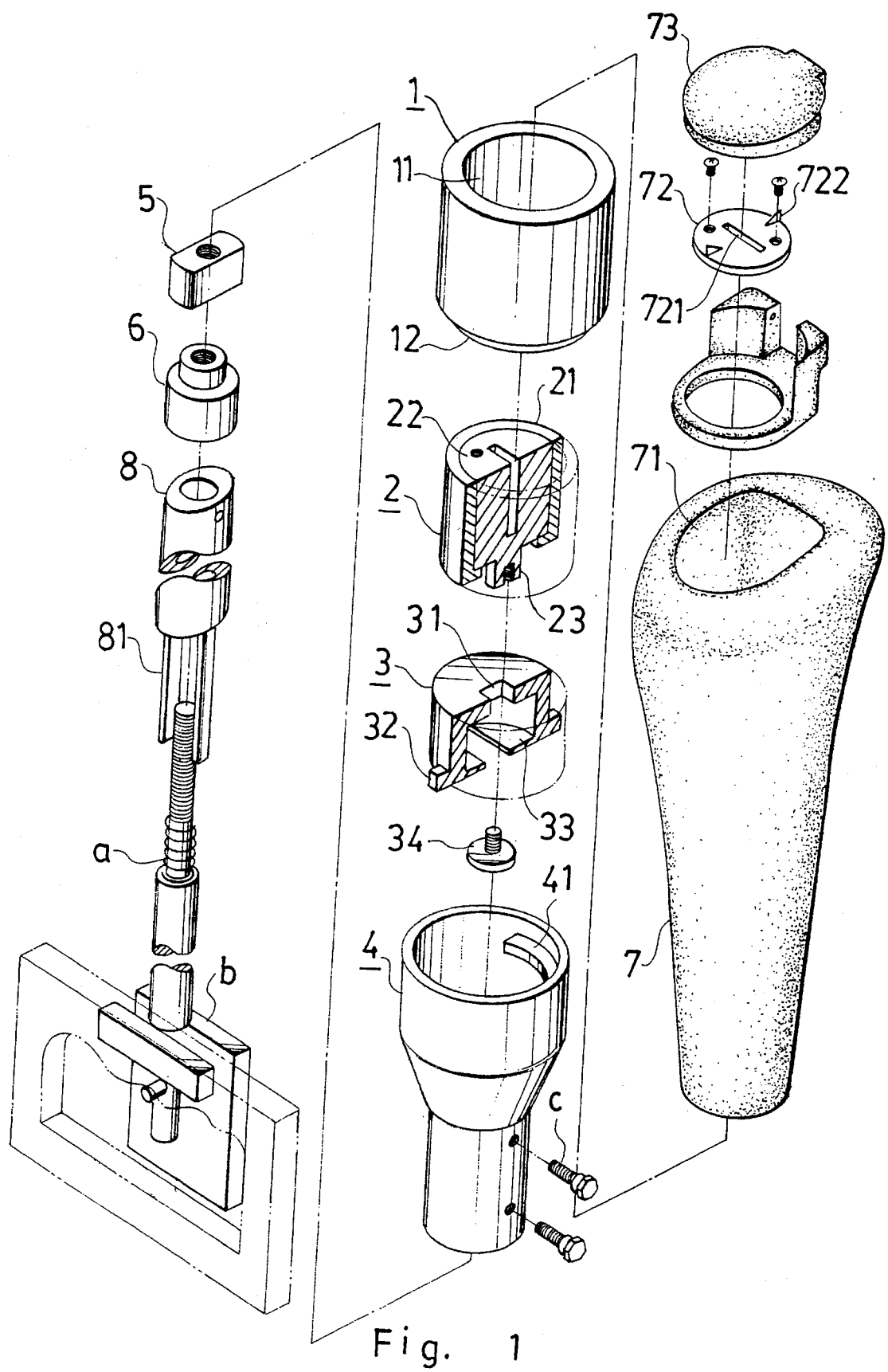
FIG. 1 is an exploded perspective view of a basic embodiment of the present invention.
Figure 1A:
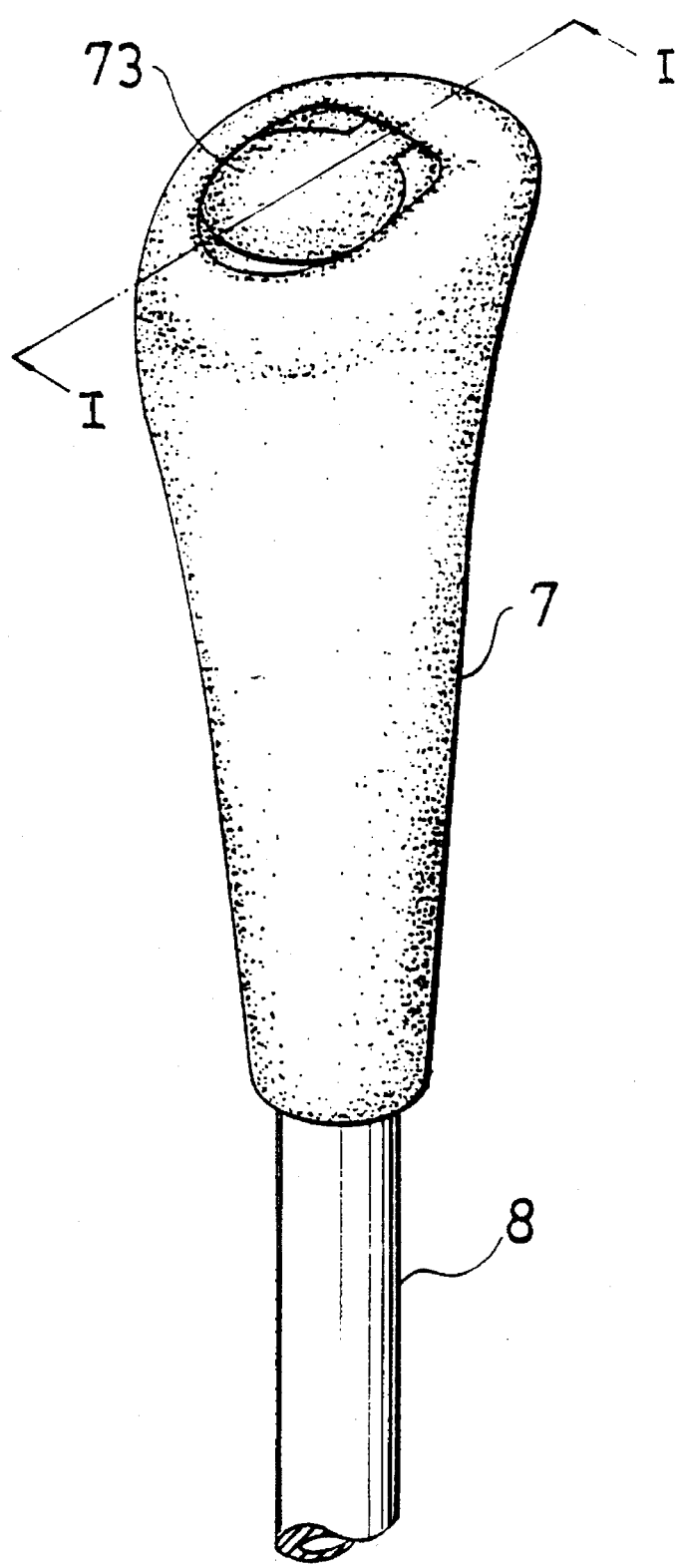
FIG. 1A is a partial perspective view of the embodiment of FIG. 1 when assembled.
Figure 2:
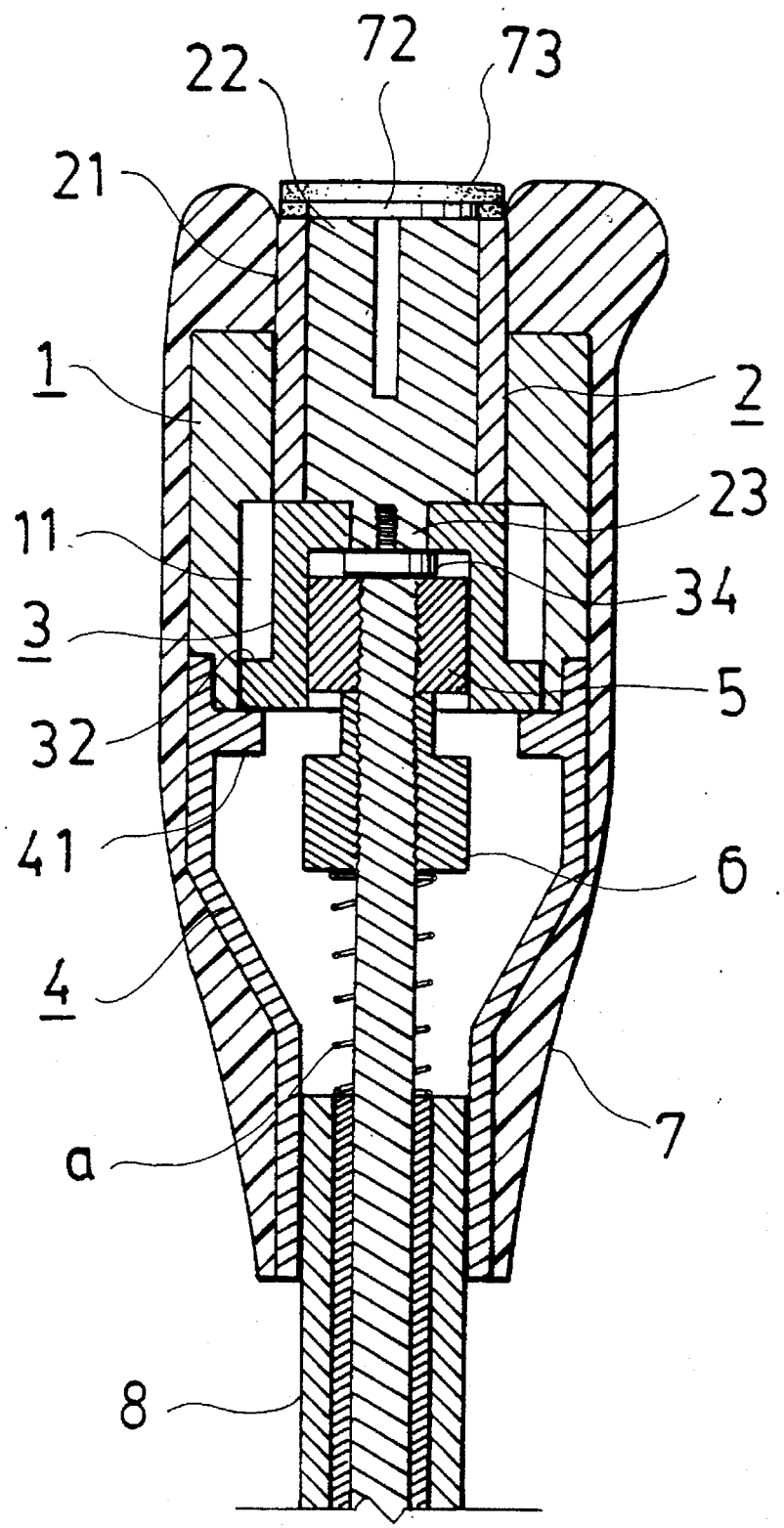
FIG. 2 is a sectional view taken along section line I—I in FIG. 1A.

It can be clearly seen in FIGS. 1 and 2 that the lock structure for the automatic shift lever a car comprises an outer pipe 1, a lever lock 2, an axle tube 3, a sheath 4, a limiting block 5, a fixing piece 6, a knob 7 and a protecting sleeve 8. A receiving hole 11 is provided in the outer pipe 1 for receiving the lever lock 2 and the axle tube 3. The lever lock 2 has its top exposed to form a push button 21. A connecting part 12 is provided at the bottom outer edge of the outer pipe 1 and a lock core 22 is provided centrally in the outer pipe 1 for insertion of a key for rotating. The lock core 22 extends down to the bottom of the lever lock 2 to form an engaging piece 23. The axle tube 3 has on the top thereof an engaging hole 31 for engaging with the engaging piece 23, and has two protruding pieces 32 each provided at one side of the bottom outer edge thereof respectively. A hollow recess 33 is provided therein, hence a fixing screw 34 can be provided to drive in the top end of the hollow recess 33 to hold tight the engaging piece 23, such that, and when the engaging piece 23 is rotated, the axle tube 3 will rotate therewith. The abovementioned connecting part 12 provided at the bottom outer edge of the outer pipe 1 is fixed on the top edge of the sheath 4 which has two protruding ribs 41 provided at both inner sides thereof and under the connecting part 12, so that the axle tube 3 received in the lower portion of the outer pipe 1 is located with its two protruding pieces 32 provided at the bottom outer edge thereof being exactly above the two protruding ribs 41. When the axle tube 3 is rotated with its two protruding pieces 32 to be in the space between the two protruding ribs 41, the axle tube 3 can be moved down simply by pressing the push button 21. The above-mentioned limiting block 5 is provided at the top end of a control link "a" of the automatic shift lever, the fixing piece 6 is provided at the bottom thereof for pulling fight the limiting block 5 and to fix the same. After the limiting block 5 is threadedly fixed onto the control link "a", it is inserted upwardly through the bottom end of the sheath 4 and through a rectangular hole at the base of the hollow recess 33 provided in the axle tube 3, then the axle tube 3 is rotated a suitable angle to allow the limiting block 5 to be engaged in the hollow recess 33. The above stated outer pipe 1, lever lock 2, axle tube 3, sheath 4, limiting block 5 and fixing piece 6 are all located on the upper portion of the automatic shift lever, while the knob 7 is provided to envelop the outer pipe 1 and the sheath 4 to allow holding by a user. A hole 71 is provided at the top of the knob 7 to allow the push button 21 on the top of the lever lock 2 to be exposed. A cover plate 72 fixed on the lock core 22 by screws and a pivotally liftable lid 73 preventing dust from dropping in are provided on the top of the lock core 22 and the push button 21 respectively. The cover plate 72 has a locking hole 721 with two lugs 722 provided on both sides thereof. In normal shifting, a user can press directly on the liftable lid 73 (which is closed normally) to operate the control link "a". While in locking, a thumb and an index finger can exert force directly on the two lugs 722 to rotate the lock core 22, and when opening, the pivotally liftable lid 73 can be lifted again to allow a key to be inserted into the locking hole 72 1 for rotating. Further, from the bottom end of the sheath 4, the protecting sleeve 8 of elliptical section and long pipe shape extends down, the protecting sleeve 8 covers the surface of the automatic shift lever and partially the control link "a" and is provided on both bottom sides thereof with two stop pieces 81 extending downwards therefrom to insert into a space between a guiding plate, which is as conventional as that represented by 51 in FIG. 10 showing the structure of a conventional automatic shift lever, and a supporting frame 1b disposed aside of the guiding plate.

The lock structure for the automatic shift lever of a car in the present invention and the relative positions thereof are apparent from the narration above. Functions thereof can be understood more clearly via the following.

Figure 3A:
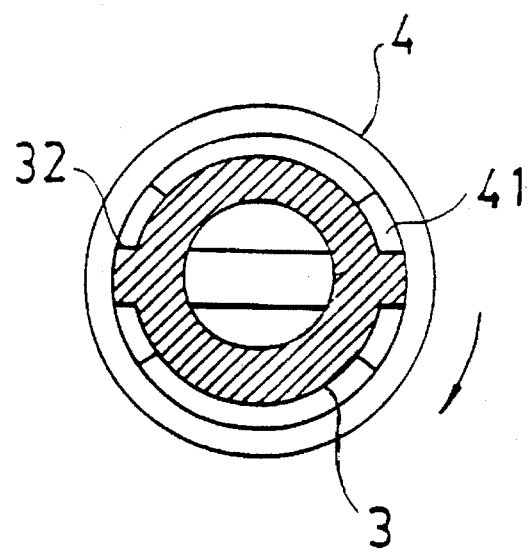
FIGS. 3A and 3B are schematic views showing the operation of releasing the locking state of the present invention.
Figure 3B:
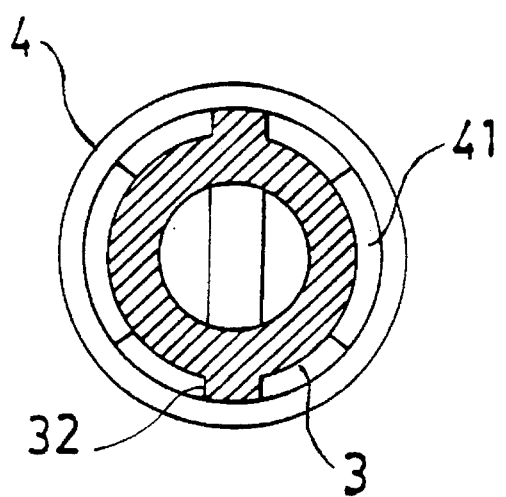
Figure 4:
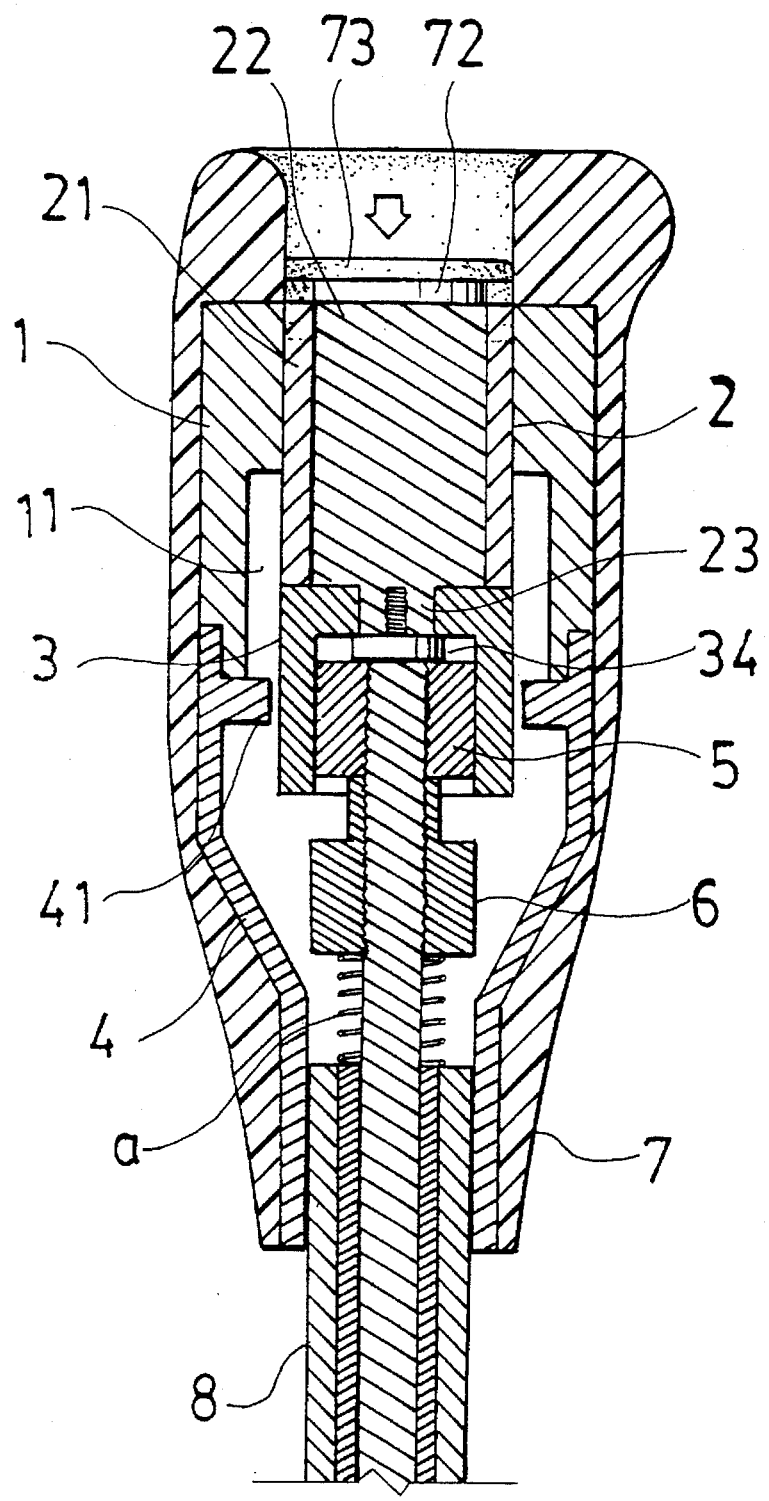
FIG. 4 is a cross-sectional view showing the operation of the control link after release of the locking state of the present invention.

From FIG. 2 which is a sectional view of the present invention when in the locked state, it can be seen that axle tube 3 located beneath the receiving hole 11 of the outer pipe 1 is held on the two protruding ribs 41 by its two protruding pieces 32 provided at the bottom outer edge thereof, so that the lever lock 2 and the axle tube 3 cannot be pressed down, i.e., the control link "a" of the automatic shift lever can not be pressed down. In this situation, the automatic shift lever cannot be operated in a normal way. Because of the location of the limiting block 5 in the hollow recess 33 of the axle tube 3, the hollow recess 33 has a positionally limiting function. The limiting block 5 is further pressed tightly by the fixing piece 6 and thus is fixed above the control link "a". When an external force is exerted to pull the bottom end of the control link "a" down, the link "a" will not be moved downwards. This can prevent a thief from prying directly at the seat for the shift lever and a reliable anti-theft effect can thus be achieved. When it is required to rotate the lock core 22 for opening the lock, the engaging piece 23 at the bottom of the lock core 22 is engaged in the engaging hole 31. Therefore the axle tube 3 will rotate therewith (please refer to FIGS. 3A and 3B), the two protruding pieces 32 provided at the bottom outer edge of the axle tube 3 will rotate therewith. When the two protruding pieces 32 are moved to the gaps between the two protruding ribs 41, the lever lock 2 and the axle tube 3 now have no impediment under them. They will both move downwards, yet when the axle tube 3 moves downwards, the limiting block 5 and the control link "a" of the shift lever for fixing will be pressed simultaneously to render the shift lever to be free from the limitation by the control link "a" for shifting normally. When it is desired to lock, release of the push button 21 will allow a spring member to restore the elements to their original positions for the lever lock 2, the axle tube 3, the limiting block 5 and the control link "a". Then direct rotation of the lock core 22 of the lever lock 2 and in turn the axle tube 3 by a key or by exerting force on the lugs 222, to move the protruding pieces 32 back to the positions above the two protruding ribs 41, will complete the locking procedure.

Figure 5A:
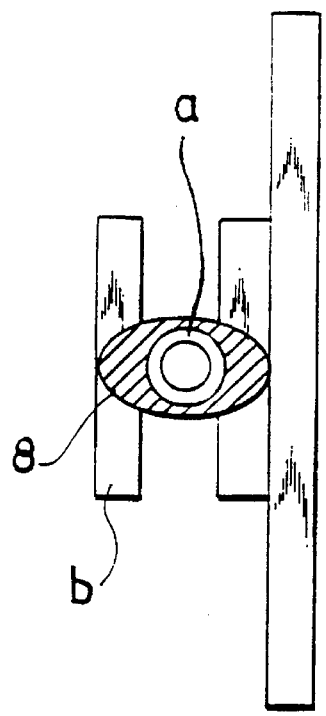
FIGS. 5A and 5B are top view and side view showing the relationship of positions between the protecting sleeve and the shift lever.
Figure 5B:
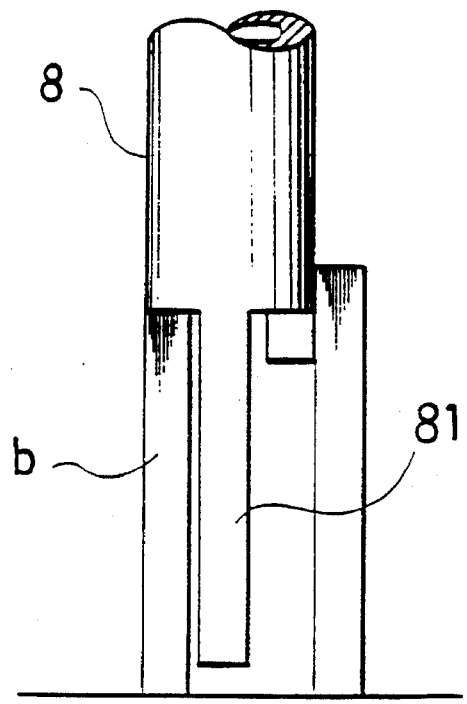

Beside providing a conveniently usable lock structure without a lock head and locking hook, the prying-proof design of the present invention renders its function to be more perfect. The elliptical protecting sleeve 8 as shown in FIGS. 1 and 5 has at its bottom end stop pieces 81 extending by the supporting frame 1b for stopping rotation of the protecting sleeve 8. The protecting sleeve 8 further is received in the lower end of the sheath 4. Although sheath 4 is fixed by a plurality of screws "c", a thief may be able to remove the screws "c", by an electrical drill to rotate the sheath 4 to move the protruding ribs 41 and pry and press the control link "a". However, the protecting sleeve 8 will now abut against the top of the supporting frame "b", (as shown in FIG. 5) to prevent the whole mechanism from moving down far enough to form an open state for shifting. The basic structure of the present invention can further be practiced pursuant to the way below.

A further improvement of the lock structure for the automatic shift lever of a car in the present invention can be seen in FIGS. 6 to 6D. It is comprised of an upper and a lower housings 10, 20 respectively covering the outer surfaces of the outer pipe 1 and the sheath 4, wherein the upper housing 10 has an upper cover plate 10 1 having a locking hole 102 which is aligned with the insertion hole provided on the lock core 22 when the cover plate 101 is fixed on the lock core 22 by screws. A pair of fixing pins 103 are provided and aligned diametrically with each other on the upper housing 10, which fixing pins 103 extend inwardly through a pair of "L" shaped guiding slots 104 on the outer pipe 1. Each fixing pin 103 has a thread on each of the front and the rear ends thereof to be screwed through the upper housing 10 and in the axle tube 3. The upper housing 10 is provided on the inner surface thereof with a pair of grooves 105 which each have an "L" shape similar to that of the guiding slots 104 and is engaged by one of a pair of guiding pieces 106 provided on the outer surface of the outer pipe 1. The guiding pieces 106 each is comprised of an elastic member with a concave receiver provided on its outer end and receiving a steel ball, used to keep a distance between the upper housing 10 and the outer pipe 1 to permit rotation of the upper housing 10 about the outer pipe 1. The top of the above-mentioned lower housing 20 engages with the upper housing 10. The sheath 4 has other two upper protruding ribs 42 respectively parallel to and located above the protruding ribs 41.

In the unlocked shiftable state of the above stated members (as shown in FIGS. 6B and 6C), the upper housing 10 is fixed to the lock core 22 by screws threaded in them via the cover plate 101, and is fixed to the axle tube 3 by the fixing pins 103 extending through the outer pipe 1. The bottom of the lock core 22 is engaged with the axle tube 3 as in the previous embodiment, so that the upper housing 10, the outer pipe 1, the lock core 22 and the axle tube 3 are engaged with one another. Each fixing pin 103 for the upper housing 10 is exactly aligned with the angular corner of one "L" shaped guiding slot 104. The angular corner of each "L" shaped groove 105 is aligned with one guiding piece 106. When the upper housing 10 is pressed down, the fixing pins 103 and the grooves 105 move downwardly, the fixing pins 103 move down respectively along the vertical parts of the "L" shaped guiding slots 104, while the grooves 105 move down to cause the steel balls on the guiding pieces 106 to rotate along the vertical parts of the "L" shaped grooves of their own, the lock core 22 therefore moves down therewith to, in turn, press the axle tube 3 and the control link "a" to effect a shifting action.

The best effect of this embodiment is the simplified locking procedure, while the structure after locking is firmer. When locked, the upper housing 10 is in an unpressed state, the fixing pins 103 and the guiding pieces 106 are located respectively at the angular corners of the guiding slots 104 and the grooves 105. A user can exert a force directly on the upper housing 10 to rotate it, which causes the lock core 22 to rotate with the axle tube 3 on which two lateral protruding pieces 32 will move (as shown in FIG. 6D) to be inserted between the protruding ribs 4 1 and the upper protruding ribs 42. The fixing pins 103 slide to the horizontal parts of the guiding slots 104, while the guiding pieces 106 also move in the horizontal pans of the grooves 105, until the lock core 22 rotates to a certain angular range to form the locked state. The whole lock is limited vertically on the exterior thereof by the fixing pins 103 and the guiding slots 104, and on the interior thereof by the protruding ribs 41 and the upper protruding ribs 42. A thief will be unable to break the lock even if he strikes the upper housing 10 heavily, a perfect locking is thus achieved. The main function of the guiding pieces 106 is to engage the grooves 105. As long as the "L" shaped grooves 105 have enough depth, if the upper housing 10 is violently vibrated so as to move to the locking position, the car will not be affected thereby, the safety of the present invention thus is absolutely guaranteed.

The above stated lower housing 20 can have an opening 201 (referring again to FIG. 6) which is located above the screw "c" used for fixing the sheath 4 (as shown in FIG. 6B). When the upper housing 10 is pressed down, the lower housing 20 will be moved down therewith to align the opening 201 with the screw "c" (as shown in FIG. 6C), so that the screw "c" can be unscrewed. If the force pressing the upper housing 10 is released, the screw "c" will be hidden again inside the lower housing 20, to prevent a thief from unscrewing the screw "c" and breaking up the whole mechanism. The upper housing 10 and the lower housing 20 can be covered by the above mentioned knob 7 to increase aesthetic beauty.

The above stated screw "c" can prevent a thief from unscrewing thereof, moreover, a cut head screw "c" can be used instead. A "cut head screw" means that when the sheath 4 is fixed to the protecting sleeve 8, the screw head "a" and the screw shank c2 of the screw "c" can be cut off from the stop piece c3 of the screw "c", so that the stop piece c3 will expose a smooth and flat surface. No one can disassemble the sheath 4 in a short time once it is firmly screwed. However, such "cut head screw c" cannot be unscrewed by any tool when the screw head "a" is cut off from the stop piece c3, and when the sheath 4 needs to be disassembled for maintenance or repairing or it is to be changed, the shift lever must be broken up. The present invention can of course be practiced in other ways, such as that shown in FIG. 8. A main body 30 of the lock is used having an imbedded lock latch 301 with threaded rod 302 provided centrally thereon. A fixed screw hole 83 matching with the threaded rod 302 is provided on the protecting sleeve 8. The main body of the lock 30 is located in a hole 43 on the sheath 4. In order not to allow the lock 30 to rotate together with the rotation of a key 40 after such locating, the surface of the main body of the lock 30 is cut to have several rotation preventing planes (303, 304). In this way, the lock 30 is located and limited by the lateral sides opposite to each other in the limiting hole 43.

When the key 40 is inserted into a locking hole 305 (as shown in FIG. 8A), the lock latch 301 can be rotated therewith (opening and checking of the key 40 will not be stated further herewith, because it is not the point of the present invention), the bolt 302 integrally connected with the lock latch 301 will of course rotate, and will be moved forward until contacting with the bottom of the fixing screw hole 83 of the protecting sleeve 8 and backward when unscrewed along the length of the fixed screw hole 83. When the key 40 is drawn out, there will be no gap left except the locking hole 305. The lock mechanism 30 is hidden in the locking hole 305 and no tool can be used to open it beside the key 40.

When the key 40 turns the bolt 302 to a dead point in the fixing screw hole 83, in order to make the key 40 easier in getting out of the locking hole 305, a plurality of releasing holes 306, 307, 308 are provided on the periphery of the locking hole 305 (as shown in FIG. 8C to BE). If the key 40 turns the bolt 302 to the dead point in the fixing screw hole 83 while an aligning member 401 on the key 40 is exactly aligned with the releasing hole 306 as is shown in FIG. 8C, the key 40 can be withdrawn directly. If the key 40 turns the bolt 302 to the dead point in the fixing screw hole 83 while the aligning member 401 on the key 40 has been over the releasing hole 306 as is shown in FIG. 8D, the key 40 can be turned back to another releasing hole 308 for being withdrawn from the locking hole 305 as is shown in FIG. 8E.

In practicing the present invention, beside the fixing methods as stated above, a protecting structure can be provided on the sheath 4. As depicted in FIGS. 9–9D, the protecting structure is comprised of a housing 50 and a protecting plate 60. The housing 50 is a hollow cover coveting a screw c' (equivalent to the screw "c" in the previous embodiment) is located and extending upwardly a predetermined length, and has an opening 51 on the front surface thereof opposite to a screw hole cl' on the sheath 4. The protecting plate 60 is a metallic plate inserted in the housing 50 for blocking the opening 51 and covering the screw hole cl'. The top end thereof extends upwardly through the thick wall of the sheath 4 to abut against the bottom lateral edge of the axle tube 3 which is provided with a guiding groove 35 on the surface thereof. When the screw "c'" is fixed, the relationship of positions between the protecting plate 60 and the housing 50 is as follows: when locking, the protecting plate 60 is embedded in the housing 50 and is limited forwardly, backwardly, leftwardly and rightwardly by the same, the top end thereof abuts against the bottom end of the axle tube 3. The protecting plate 60 cannot be moved but covers the screw "c'" completely. Thus the screw "c'" can be prevent from being detached. When unlocking, the axle tube 3 is rotated (referring to FIG. 9) until a place where the guiding groove 35 is exactly aligned with the protecting plate 60 therebeneath. The impediment on top of the protecting plate 60 is removed, and just by a lifting force exerted on the protecting plate 60 at the opening 51 the protecting plate 60 may be moved upwardly and reveal the screw "c'". The lever lock can thus be unlocked. The screw "c'", in this embodiment does not need a specific "cut head screw" and the aim of preventing a thief from detachment can be achieved. Also, the convenience for maintenance and safety can be obtained as well.

The invention may assume numerous forms and is to be construed as including all modifications and variations falling within the scope of the appended claims.

I claim:

1. A lock structure for an automatic shift lever of a car, comprising:

an outer pipe provided at an upper part of a shift lever in said car and having a receiving hole therein as well as a connecting part at a bottom outer edge thereof;

a lever lock received in said receiving hole, having a top exposed to form a push button, a lock core provided centrally in said outer pipe extending down to a bottom of said lever lock to form an engaging piece;

an axle tube received in said receiving hole, having on a top thereof an engaging hole for engagement with said engaging piece, and having two protruding pieces provided at each side of a bottom outer edge thereof respectively, a hollow recess being provided therein; and a sheath having a top connecting to said connecting part on said outer pipe, the sheath having two protruding ribs provided on sides thereof and under said protruding pieces said protruding ribs having gaps therebetween for enabling downward moving of said protruding pieces, a limiting block engaged in said hollow recess of said axle tube so as to be limited from upward and downward movement, and being fixed at a bottom end on a control link of said automatic shift lever; whereby when said protruding ribs are supported by said protruding pieces, and said limiting block is engaged in said hollow recess, said push button, said lever lock, said axle tube, said limiting block and said control link are locked and prevented from moving, and when said lock core is rotated said engaging piece being engaged in said engaging hole to cause said axle tube to rotate there with so as to move said protruding pieces to said gaps between said two protruding ribs, thereby enabling depression of said push button to force said lever lock, said axle tube, said limiting block and said control link downwards, to enable shifting of the shift lever.

2. A lock structure for all automatic shift lever of a car as stated in claim 1, wherein said limiting block is affixed to the top end of said control link, and a fixing piece is provided at a bottom thereof.

3. A lock structure for an automatic shift lever of a car as stated in claim 1, wherein said engaging piece engaged in said engaging hole is further provided with a fixing screw for driving in a top end of said hollow recess to hold tight said engaging piece.

4. A lock structure for an automatic shift lever of a car as stated in claim 1, further comprising a knob enveloping said outer pipe and said sheath, a hole provided at a top of said knob to allow said push button on the top of said lever lock to be exposed.

5. A lock structure for an automatic shift lever of a car as stated in claim 1, further comprising a cover plate and a pivotally liftable lid on top of said push button, said cover plate having a locking hole aligned with a lock core and two lugs on opposite sides thereof, said liftable lid is pivotally attached to one edge of said cover plate so as to cover said cover plate.

6. A lock structure for automatic shift lever of a car as stated in claim 1, further comprising an elongated protecting sleeve of elliptical cross-section extending down from a bottom of said sheath, said protecting sleeve covers a surface of an automatic shift lever and partially covering a control link, the protecting sleeve having on a bottom side thereof with two stop pieces.

7. A lock structure for the automatic shift lever of a car as stated in claim 6, wherein said sheath, said shift lever and said protecting sleeve are fixed by a screw which can have a screw head cut off.

8. A lock structure for an automatic shift lever of a car as stated in claim 1, wherein said sheath, and said shift lever are fixed further by a lock mechanism for said sheath, wherein said lock mechanism comprises:

a lock body having a plurality of rotation preventing planes formed in a wall of said sheath, and having an embedded lock latch with a threaded rod provided centrally thereon; a fixed screw hole aligned with said threaded rod provided on a lateral external surface of said shift lever; and a key provided for inserting into said lock body to turn said lock latch and said bolt in and out of said fixed screw hole.

9. A lock structure for an automatic shift lever of a car as stated in claim 1, further comprising a protecting structure provided on said sheath, said protecting structure comprising:

a hollow housing fixed on said sheath, and covering a screw hole on said sheath, an opening being provided on a front surface of said housing aligned with said screw hole on said sheath;

a protecting plate movably located in said hollow housing, a bottom portion thereof blocking said opening, a top end thereof extending upwardly through a wall of said sheath to abut against a bottom lateral edge of said axle tube; and a guiding groove provided on a surface of said axle tube, and having a width sufficient to movably accommodate therein said protecting plate; whereby, when unlocked, said axle tube is rotated to a position in which the guiding groove is aligned with said protecting plate therebeneath, such that a lifting force exerted on said protecting plate through said opening, will move said protecting plate upwardly and reveal said screw.

10. A lock structure for an automatic shift lever of a car as stated in claim 1, further comprising:

an upper and a lower housing covering said outer pipe and said sheath, wherein said upper housing has an upper cover plate, said upper cover plate provided with a locking hole which is aligned with an insertion hole provided on a lock core when said cover plate is fixed downwardly on said lock core; a pair of fixing pins aligned diametrically with each other on the upper housing, which fixing pins extend inwardly through a pair of invoked "L" shaped guiding slots on said outer pipe, each fixing pin is screwed through said upper housing and into said axle tube; said upper housing is provided on an inner surface thereof with a pair of "L" shaped grooves each engaged by a guiding piece provided on an outer surface of said outer pipe to keep a distance between said upper housing and said outer pipe to permit rotation of said upper housing about said outer pipe; a top of the lower housing engaging said upper housing, said sheath having two upper protruding ribs respectively parallel to and located above said protruding ribs;

whereby pressing said upper housing will cause said lock core and said axle tube to move downwardly, thus causing said fixing pins and said guiding pieces to move along the vertical pans of said inverted "L" shaped guiding slots and said "L" shaped grooves respectively to move said control link for shifting; and whereby a lateral force turns said lock core and said axle tube to a locking position wherein said protruding pieces are engaged between said protruding ribs and said upper protruding ribs, and said fixing pins and said guiding pieces are moved to horizontal parts of said inverted "L" shaped guiding slots and said "L" shaped grooves respectively to prevent said upper housing from being pressed down.

11. A lock structure for an automatic shift lever of a car as stated in claim 10, wherein each of said fixing pins has threaded front and rear ends to facilitate being screwed through said upper housing and into said axle tube.

12. A lock structure for an automatic shift lever of a car as stated in claim 10, wherein each of said guiding pieces comprises a spring with a concave receiver provided on an outer end and a steel ball located in said concave receiver.

13. A lock structure for an automatic shift lever of a car as stated in claim 10, wherein said upper and said lower housings are enveloped by a knob having a hole in a top thereof to allow lifting of said liftable lid.

* * * * *